(12) United States Patent
Ishvarchandra et al.

(10) Patent No.: US 9,516,097 B1
(45) Date of Patent: Dec. 6, 2016

(54) LOCATION AWARE SERVICE INSTANCE DISCOVERY

(71) Applicant: Cisco Technology, Inc., San Jose, CA (US)

(72) Inventors: Fajalia Bhavik Ishvarchandra, Bangalore (IN); Ramamurthy Pani Kesapragada, Bangalore (IN); Sudhir K Jain, Fremont, CA (US); Suganthi Ramasamy, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 407 days.

(21) Appl. No.: 14/088,712

(22) Filed: Nov. 25, 2013

(51) Int. Cl.
*G06F 15/16* (2006.01)
*H04L 29/08* (2006.01)

(52) U.S. Cl.
CPC ................................. *H04L 67/10* (2013.01)

(58) Field of Classification Search
CPC ........................................................ H04L 67/10
USPC .......................................................... 709/203
See application file for complete search history.

(56) References Cited

U.S. PATENT DOCUMENTS

| | | | |
|---|---|---|---|
| 7,336,670 B1 * | 2/2008 | Calhoun | H04L 63/10 370/252 |
| 7,356,510 B2 * | 4/2008 | Durand | G06F 21/10 705/50 |
| 9,130,859 B1 * | 9/2015 | Knappe | H04L 45/16 |
| 2003/0123420 A1 * | 7/2003 | Sherlock | H04W 24/00 370/338 |
| 2005/0073980 A1 * | 4/2005 | Thomson | H04W 16/20 370/338 |
| 2007/0053362 A1 * | 3/2007 | Garg | H04L 12/24 370/395.1 |
| 2008/0008117 A1 * | 1/2008 | Alizadeh-Shabdiz | G01S 5/02 370/328 |
| 2009/0067436 A1 * | 3/2009 | Gast | H04L 12/4679 370/395.53 |
| 2009/0088182 A1 * | 4/2009 | Piersol | H04W 48/12 455/456.1 |
| 2009/0109855 A1 * | 4/2009 | Gong | H04W 16/10 370/238 |

(Continued)

OTHER PUBLICATIONS

S. Chesire, "Hybrid Unicast/Multicast DNS-Based Service Discovery", http://www.ietf.org/id/draft-cheshire-mdnsext-hybrid-01.txt, Jun. 25, 2013, 10 pp.
Aerohive Networks, Inc.—"Bonjour Gateway"—http://www.aerohive.com/pdfs/Aerohive-Solution_Brief-Bonjour_Gateway.pdf, Copyright 2012, Aerohive Networkds, Inc., 9 pp.

(Continued)

*Primary Examiner* — Anthony Mejia
(74) *Attorney, Agent, or Firm* — Patterson + Sheridan, LLP (57) ABSTRACT

Network elements provide associated client devices querying for network services with one or more lists of services in accordance with a physical location of the associated client devices relative to the network elements irrespective of membership of the client devices in any one or more VLANs of the network. Network service instances on a first VLAN are reported to the querying client device on a second VLAN in accordance with a physical location of the client device relative to the network elements. The one or more lists of services provided to the querying client device include intuitive location tag information for identifying the services and the locations of the services. The location and service data of the location tag may be presented in a concatenated format.

20 Claims, 8 Drawing Sheets

(56) References Cited

U.S. PATENT DOCUMENTS

| | | | | |
|---|---|---|---|---|
| 2010/0085884 | A1* | 4/2010 | Srinivasan | H04W 16/08 |
| | | | | 370/252 |
| 2010/0199188 | A1* | 8/2010 | Abu-Hakima | H04L 12/1895 |
| | | | | 715/733 |
| 2011/0250903 | A1* | 10/2011 | Huang | G01S 5/0263 |
| | | | | 455/456.1 |
| 2013/0089051 | A1* | 4/2013 | Bai | H04W 52/243 |
| | | | | 370/329 |
| 2013/0172005 | A1* | 7/2013 | Finlow-Bates | H04W 64/003 |
| | | | | 455/456.1 |
| 2013/0201979 | A1* | 8/2013 | Iyer | H04W 84/12 |
| | | | | 370/338 |
| 2013/0305332 | A1* | 11/2013 | Narasimhan | H04W 12/04 |
| | | | | 726/7 |
| 2014/0075523 | A1* | 3/2014 | Tuomaala | H04L 63/083 |
| | | | | 726/6 |
| 2014/0211691 | A1* | 7/2014 | Emadzadeh | H04W 64/00 |
| | | | | 370/328 |
| 2015/0063336 | A1* | 3/2015 | Cherian | H04W 76/025 |
| | | | | 370/338 |
| 2015/0120951 | A1* | 4/2015 | Wilson | H04L 43/08 |
| | | | | 709/229 |

OTHER PUBLICATIONS

Bhandari, S. et al. "Extending Multicast DNS Across Local Links in Campus and Enterprise Networks", http://tools.ietf.org/pdf/draft-bhandari-dnssd-mdns-gateway-00.pdf, continued—The Internet Engineering Task Force (IETF); http://www.ietf.org, Jul. 15, 2013, 12 pp.

* cited by examiner

LOCATION AWARE SERVICE INSTANCE DISCOVERY

TECHNICAL FIELD

The present disclosure relates generally to discovery and advertisement of services for devices in wireless and wired networks.

BACKGROUND

Optimization of providing services to devices in a network in a simplistic manner without compromising security has become increasingly important. "Service-aware" networks provide service availability across the network and control access to these services based on a user's context, identity, location, application, and user's device in use. Standard mDNS based service discovery is a layer-2 discovery protocol which is not routable across virtual local area networks (VLANs), and is therefore not practical for discovery and advertisement of services in large enterprise networks.

Clients using a device such as a mobile device to query large enterprise networks for services can be overwhelmed by received service provider details that might not be of much use or relevance to the client based on the client's current physical location even though the reported services are limited to those on the querying client's VLAN.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there are disclosed herein techniques wherein network elements provide associated client devices querying for services with one or more lists of services in accordance with a physical location of the client relative to the network elements irrespective of membership of the client device in any one or more VLANS. In particular embodiments, the one or more lists of services provided to the querying client device includes intuitive location tag information for identifying the services and locations of the services.

In accordance with an example embodiment, there is disclosed herein an apparatus comprising a first interface configured to communicate with an associated first access point on a first virtual local area network (VLAN) wherein the first access point supports a first service instance set local to the first access point, a second interface configured to communicate with an associated second access point on a second VLAN wherein the second access point supports a second service instance set local to the second access point, and gateway logic coupled with the first and second interfaces wherein the gateway logic is configured to send and receive data via the first and second interfaces. The gateway logic is operable to receive from the first AP via the first interface a first service query from an associated client device of the first access point on the first VLAN. The gateway logic is further operable in response to the first service query to transmit to the first access point via the first interface data representative of the second service instance set supported by the second access point on the second VLAN different than the first VLAN.

In accordance with a further example embodiment, there is disclosed herein a method comprising receiving, by gateway logic from a first access point on a first VLAN via a first interface, a first service query from an associated client device of the first access point, wherein the first access point supports a first service instance set and, responsive to the query, transmitting to the first access point via the first interface data representative of a second service instance set supported by a second access point on a second VLAN different than the first VLAN.

In accordance with yet a further example embodiment, there is disclosed herein logic encoded in one or more tangible non-transient computer-readable media for execution by a processor and when executed by the processor the logic being operable to receive, by gateway logic from a first access point on the first VLAN via the first interface, a first service query from an associated client device of the first access point, wherein the first access point supports a first service instance set and, responsive to the query, transmit to the first access point via the first interface data representative of a second service instance set supported by a second access point on a second VLAN different than the first VLAN.

In accordance with a still further example embodiment, there is disclosed herein an access point comprising a first interface coupling the access point with an associated enterprise network controller by an associated first VLAN, a second interface selectively coupling the access point with an associated client device, and control logic coupled with the first and second interfaces, wherein the control logic is operable to receive service request data representative of a service request from the associated client device and to communicate the service request data to the associated enterprise network controller via the first virtual local area network. The control logic is further operable to receive service instance data from the associated enterprise network controller via the first VLAN, wherein the service instance data is representative of a service instance available to the associated client device on a second virtual local area network different than the first virtual local area network. The control logic is further operable to communicate the service instance data to the associated client device by the first VLAN via the second interface.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The embodiments herein provide discovery of services and advertisement of those services to associated client devices in a simplistic manner to users of the client devices without compromising security. The network infrastructure disclosed herein is "service-aware" wherein it provides service availability seamlessly across the network including spanning multiple different VLANs and controls access to those services based on a user's context including for example identity, location, application, and client device in use.

Service discovery is available using the mDNS protocol. When a wireless LAN controller (WLC) acts as a gateway using the mDNS protocol, it processes all mDNS service advertisements and mDNS query packets. In accordance with the example embodiments herein, however, the location-aware servicing of client device queries are provided in at least two logical phases including a Discovery Phase for finding the locations of the service instances including for example service providers across one or more VLANs, and caching the service information in a memory at a gateway device along with data representative of the location of the services, and an Advertisement Phase for advertising the services in such a way that the one or more client devices can see the list of services together with the locations of the service providers.

In accordance with an embodiment, in the logical Discovery Phase of a methodology, the embodiments herein find the locations of the service providers. Since wired service providers such as for example devices wired to an access point are not mobile, they are to be named in such a way that the name of the service provider self-contains the location associated with or given to the access point, for example. As an example, the string "HP_printer_cube1_ff_bld1._ipp._tcp.local" indicates in an example embodiment that this service instance is a physical printer of a particular type and located near cube 1 on the first floor of building 1. In accordance with the embodiments, this approach provides superior results for wired devices when the service provider and the client devices are on the same VLAN which does not span across floors or buildings.

In accordance with an embodiment, the locations of wired service providers using an access point utilizing the mDNS protocol is provided. In this embodiment, an access point connected to the switch where wired devices are attached is configured as an mDNS access point, wherein there is one mDNS access point per single wired VLAN or multiple wired VLANs. This access point then snoops all of the mDNS packets and sends them to the WLC where it has joined. The WLC tags all the service instances learned through this mDNS access point with the location of the access point.

Any wireless user device may attach to the network through the access point, which is an edge device. The access point is used as the location representative of the wireless device. When a wireless client device sends a query for a service, the access point and neighboring access points are used as the location reference. If the access point or any of its neighbor access points reported the service the client device was looking for, a response to the query includes a list of service instances which are in close proximity to the client device. In this way the wired service providers are detected and served to the wireless clients that are in the same location.

In a further embodiment, the locations of wireless service instances are detected. In accordance with an embodiment, when a service provider is a wireless client, the WLC knows the access point wherein the service provider client is attached. All the mDNS advertisements received at the WLC are then tagged with the MAC address of the access point where the service provider is attached.

When a mDNS service query from a wireless client is received by the WLC, the WLC knows the access point MAC address where the query requestor is associated. The WLC maintains Radio Resource Management (RRM) proximity group data. The WLC searches the RRM database to find the neighbor access points of the querying client. The WLC then filters the only service providers which are present in the RRM proximity group and sends the mDNS response with those service providers. This ensures that the client sees only those service providers that are physically located nearby.

In the logical Advertisement Phase of a protocol in accordance with an embodiment, service instance location information is communicated to the client. In one embodiment, the client receives advertisements from only nearby service providers. However, in this embodiment the client would not necessarily know the exact location of the service.

Therefore, to communicate the location of the service, in accordance with a further example embodiment, a location tag is provided together with data representative of the service provider name. In accordance with an example, if an Apple™ television named "cisco-tv" is located in a conference room on the 6$^{th}$ floor in building 2 and the nearby access point is wired with the Apple™ television and configured with the location field as "Conf1-6thFloor-BLDG2" then the WLC uses this information and tags the query response with the Apple television service name. In accordance with this example embodiment herein, a location aware service name is formulated as "cisco-tv@Conf1-6thFloor-BLDG2".

In accordance with the above example embodiment, anyone who discovers the Apple TV service with this name would also learn about the location of the Apple TV service. One benefit is that even if the Apple TV is moved to a different conference room, the name/location need not be reconfigured for each of the service providers. In the example embodiment, the WLC automatically changes the name of the location aware service name to indicate the changed location. In an embodiment the WLC filters the service providers based on location. In a further embodiment the WLC prioritizes the nearby service providers and then sends them first in the response followed by the service providers who are located far away from the querying client device.

In an example embodiment, there is disclosed herein a technique that determines, based on location information of an associated client device, network services that are available to the device. As will be described in more detail herein, the technique is employed to provide the information to the device for network services that may be available to the device on one or more VLANs different than the VLAN of the device. Further as will be described in more detail herein, the technique provides the network services information to the device in a location tag format comprising data representative of a service name and data representative of a service location for ease of selection and use of the services by operators of the device.

Figure 1:
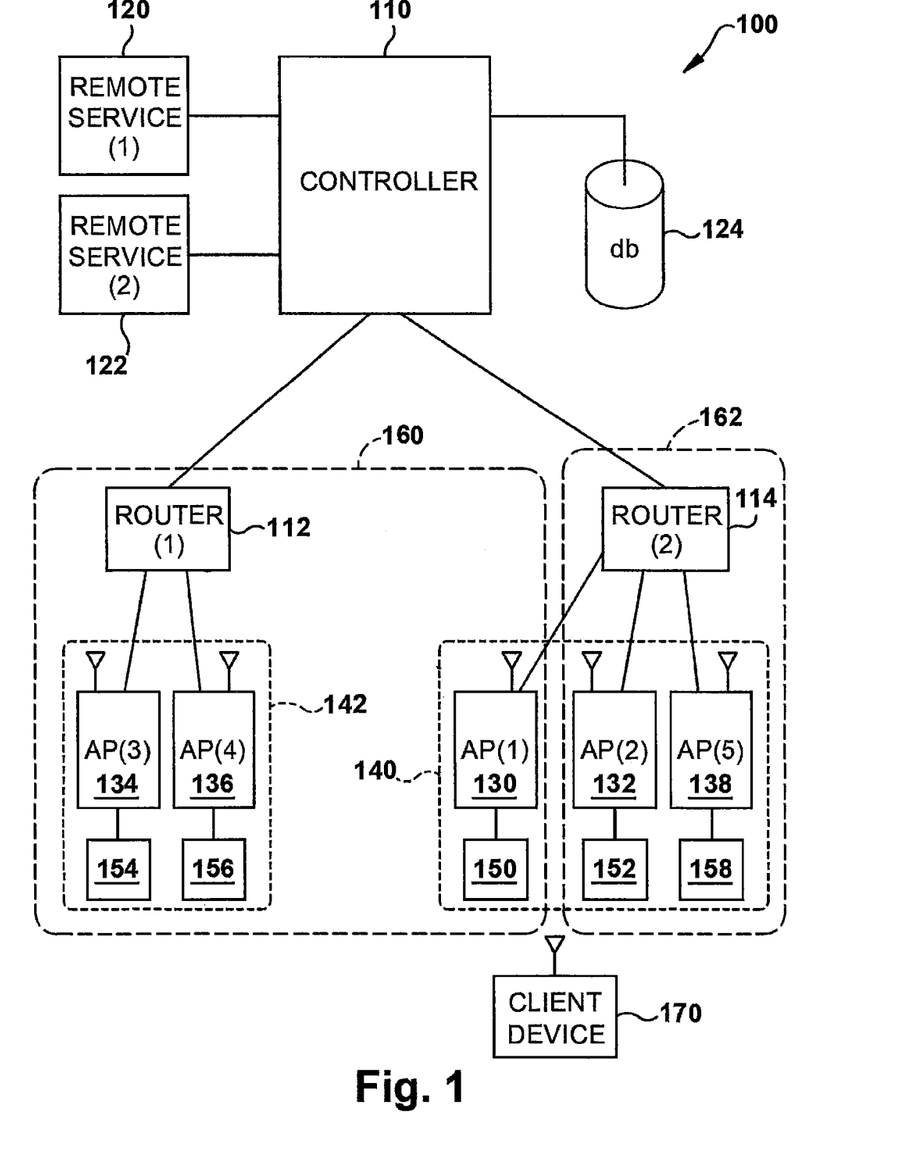
FIG. 1 illustrates an example of a network employing apparatus operable to provide location aware service instance discovery and advertisement in accordance with an example embodiment.

FIG. 1 illustrates an example of a network 100 employing one or more apparatus operable to provide location aware service instance discovery and advertisement in accordance with an example embodiment. With reference now to that FIGURE, the network 100 comprises an enterprise network controller 110 operatively coupled with a first router apparatus 112 and with a second router apparatus 114. The enterprise network controller 110 locally supports a first remote network service instance 120 and a second remote network service instance 122. In the example embodiment, the first remote network service instance 120 may be any one or more network service(s) now known or hereinafter developed including for example bulk printing facility services, archiving services, video recording services or the like. Similarly, the second remote network service instance 122 may be any one or more network service(s) now known or hereinafter developed including for example bulk printing facility services, archiving services, video recording services or the like. For providing storage for archiving and the like, the network controller is operatively coupled with a database 124.

In the example illustrated, the first and second router apparatus 112, 114 are further operatively coupled with sets of access points. To that end, the second router apparatus 114 is operatively coupled with a first access point 130, a second access point 132, and a fifth access point 138. It is to be appreciated that in the example embodiment, each of the first access point 130, the second access point 132, and the fifth access point 138 are co-located at a first common physical location 140. The common physical location 140 may be any physical location such as for example a conference room, a hallway, a level of a parking garage, or the like. Similarly, the first router apparatus 112 is operatively coupled with a third access point 134 and a fourth access point 136. It is to be appreciated that in the example embodiment, each of the third access point 134 and the fourth access point 136 are co-located at a second common physical location 142, which may be any physical location such as for example a conference room, a hallway, a level of a parking garage, or the like.

Each of the access points 130, 132, 134, 136, and 138 supports a corresponding set of local network services 150, 152, 154, 156, and 158. In particular, the first access point 130 supports a first set 150 of local and/or wired network service instances such as local printers, video equipment, audio equipment, or the like, the second access point 132 supports a second set 152 of local and/or wired network service instances, the third access point 134 supports a third set 154 of local and/or wired network service instances, the fourth access point 136 supports a fourth set 156 of local and/or wired network service instances, and the fifth access point 138 supports a fifth set 158 of local and/or wired network service instances.

Further in the example, embodiment, the first router apparatus 112 together with the first, third and fourth access points 130, 134, and 136 form a first VLAN 160. In addition, the second router apparatus 114 together with the second and fifth access points 132 and 138 form a second VLAN 162.

In accordance with an embodiment, an associated client device 170 may be associated with the network 100 by the first virtual local area network (VLAN1) 160 or by the second virtual local area network (VLAN2) 162 and, further, may query the corresponding access points 130, 132, respectively for network services available to the client and physically close to the first physical location 140. In one embodiment the client device 170 is associated with the first VLAN 160 and queries the first access point 130 for network service instance information. The controller 110 provides location aware service discovery and broadcast support wherein, responsive to the query, the controller provides service instance data representative of the first set 150 of services of the first access point 130 on the first VLAN 160 as well as service instance data representative of the second set 152 of services of the second access point 132 on the second VLAN 162 different than the first VLAN 160. The controller may also selectively provide service instance data representative of the first and second remote network service instances 120, 122 local to the enterprise network controller 110.

Similarly, in another embodiment, client device 170 is associated with the second VLAN 162 and queries the second access point 132 for network service instance information. The enterprise network controller 110 provides location aware service discovery and broadcast support wherein, responsive to the query, the controller provides service instance data representative of the second set 152 of services of the second access point 132 on the second VLAN 162 as well as of the first set 150 of services of the first access point 130 on the first VLAN 160 different than the second VLAN 162.

In an embodiment, the service instance data representative of service instance sets available to the associated client device includes data representative of a name of the service such as, for example, a descriptive or logical name of the service, and data representative of a location of the service such as for example a physical location of the service and/or of the access point for example supporting the service.

Figure 2:
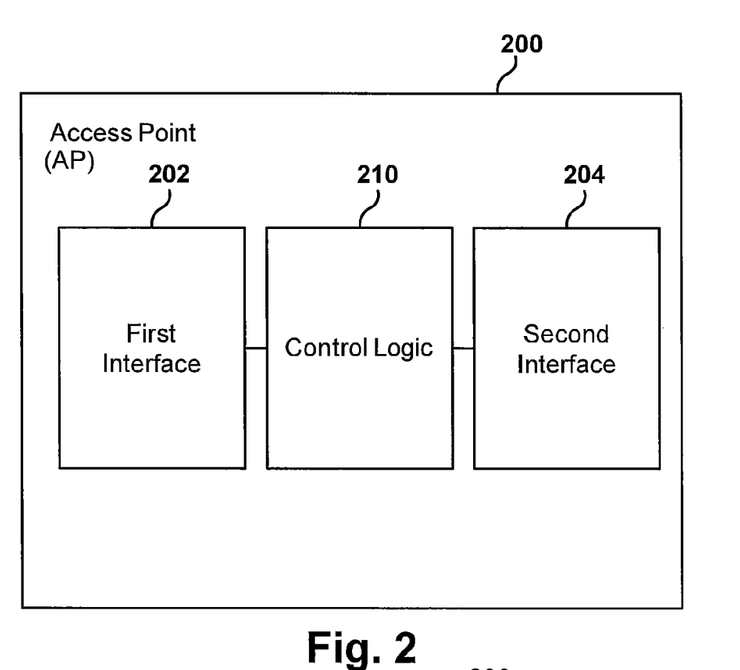
FIG. 2 is a block diagram of an access point operable in the network of FIG. 1 for providing location aware service instance discovery and advertisement in accordance with an example embodiment.

FIG. 2 is a block diagram illustrating an access point (AP) 200 operable to interface the enterprise network controller 110 with the associated client device 170 in accordance with an example embodiment. The access point 200 comprises a first interface 202 for coupling the access point 200 directly or indirectly via a router or the like with the associated enterprise network controller 110 by an associated first VLAN 160, and a second interface 204 selectively coupling the access point 200 with the associated client device 170. The access point of the example further comprises control logic 210 coupled with the first and second interfaces, wherein the control logic is operable to receive service request data representative of a service request from the associated client device 170. "Logic," as used herein, includes but is not limited to hardware, firmware, non-transient software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, non-transient memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In accordance with the example embodiment, the control logic 210 is operable to receive service instance data from the enterprise network controller 110 via the first virtual local area network 160, wherein the service instance data is representative of a service instance available to the associated client device 170 on the second VLAN 162 different than the first VLAN 160. The control logic 210 is further operable to communicate the service instance data to the associated client device 170 by the first VLAN 160 via the second interface 204. Further in accordance with the example embodiment, the control logic 210 is operable to receive service instance data from the enterprise network controller 110 via the second virtual local area network 162, wherein the service instance data is representative of a service instance available to the associated client device 170 on the first VLAN 160. The control logic 210 is further operable to communicate the service instance data to the associated client device 170 by the second VLAN 162 via the second interface 204.

Further in accordance with a particular example embodiment, the control logic 210 is operable to receive service instance data representative of a service instance available to the associated client device 170 on the second access point 132 associated with the second VLAN 162, and communicate the service instance data to the associated client device 170 by the first VLAN 160 via the second interface 204.

Still further in accordance with the example embodiment, the control logic 210 is operable to receive location tag data from the associated enterprise network controller 110 via the first VLAN 160, wherein the location tag data comprises service name data representative of a name of the service instance available to the associated client device 170 on the second access point 132, and location data representative of a location of the second access point associated with the second virtual local area network 162. The control logic 210 is further operative to communicate the service name data and the location data of the associated client device 170 for visual rendering on an associated display of the associated client device. In the example embodiment, the service name data and the location data may be concatenated as a location aware service name such as: "service_name_data@location_data" for example. In a further particular example embodiment wherein the service instance may be an Apple™ television available at a location in a first conference room, an example of the location aware service name would be "Apple_TV@Conference_Room_#1" for example.

Yet further in accordance with the example embodiment, the control logic 210 is operable to communicate identification data representative of an identification of the access point 130 to the associated enterprise network controller 110 via the first VLAN 160, and to communicate service instance identification data representative of one or more local service instances associated with the access point 130 to the associated enterprise network controller 110.

Yet still further in accordance with the example embodiment, the control logic 210 is operable to receive service instance data representative of one or more network service instance(s) local to the enterprise network controller 110 and available to the associated client device 170 via either or both VLANs 160, 162, and communicate the service instance data representative of the network service instances 120, 122 local to the enterprise network controller 110 to the associated client device 170 by the first VLAN 160 via the second interface 204.

Figure 3:
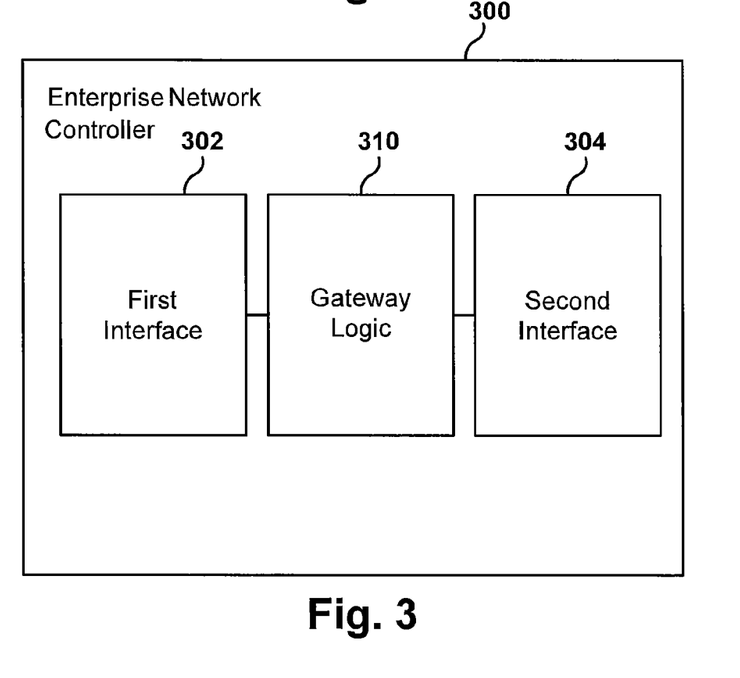
FIG. 3 is a block diagram of an enterprise network controller operable in the network of FIG. 1 for providing location aware service instance discovery and advertisement in accordance with an example embodiment.

FIG. 3 is a block diagram illustrating a controller apparatus 300 operable in an example embodiment to provide to associated client devices querying for network service instances with one or more lists of service instances in accordance with a physical location of the associated client device relative to the network elements supporting those service instances irrespective of membership of the client device in any one or more VLANs of the network. A network service instance 150 on the first VLAN 160 is selectively reported to the querying client device 170 on a second VLAN 162 in accordance with a physical proximity of the client device relative to the network elements 130, 132, 138 at the first location 140. Similarly, network service instances on a second VLAN 162 are selectively reported to the querying client device on a first VLAN 160 in accordance with a physical proximity of the client device 170 relative to the network elements 134, 136.

In accordance with the example embodiment, the controller 300 comprises a first interface 302, a second interface 304, and gateway logic 310. The first interface 302 is configured to communicate with the associated first access point 130 on the first VLAN 160, wherein the first access point supports the first service instance set 150 local to the first access point. The first service instance set 150 may be physically wired to the first access point 130 and is therefore physically close to the second and fifth access points 132, 138 and is further within the first physical location 140. The second interface 304 is configured to communicate with the associated second access point 132 on the second VLAN 162, wherein the second access point 132 supports the second service instance set 152 local to the second access point. Similarly, the second service instance set 152 may be physically wired to the second access point 132 and is therefore physically close to the first and fifth access points 130, 138 and is also further within the first physical location 140.

The gateway logic is coupled with the first and second interfaces 302, 304 and is configured to send and receive data via the first and second interfaces 302, 304. In the example embodiment, the gateway logic is operable to receive from the first access point 130 via the first router 112 and the first interface 302 a first service query from an associated client of the first access point on the first VLAN 160 and, in response to receiving the first service query, to transmit to the first access point 130 via the first interface 302 data representative of the second service instance set 152 supported by the second access point 132 on the second VLAN based on the second service instance set 152 being wired with the second access point 132 and based on the physical proximity of the second access point 132 to the first access point 130. Similarly, based on the second service instance set 152 being wired to the second access point 132, the fifth service instance set 158 being wired to the fifth access point 138, and the second and fifth access points 132, 138 being within the first location 140, in the example embodiment, the gateway logic is operable to receive from the second access point 132 via the second router 114 and the second interface 304 a second service query from the associated client 170 of the second access point 132 on the second VLAN 162 and, in response to receiving the second service query, to transmit to the second access point 132 via the second interface 304 data representative of the first service instance set 150 supported by the first access point 130 on the first VLAN based on the first service instance set 150 being wired with the first access point 130 and based on the physical proximity of the second access point 132 to the to the first access point 130.

Further in accordance with the example embodiment, the gateway logic 310 is operable to determine an association of the second access point 132 with the first access point 130 and, in accordance with the association, to store data representative of the association in the database 124 and to selectively transmit to the first access point 130 via the first interface 302 the data representative of the second service instance set 152 supported by the second access point 132 on the second VLAN 162. Still further in accordance with the example embodiment, the gateway logic 310 is operable to determine an association between the first, second, and fifth access points 130, 132, and 138 as being in close physical proximity such as being within the first location 140 for example, and, in accordance with the association of the collection of devices relative to the first location 140, to store data representative of the association in the database 124 coupled with the enterprise network controller 110, and to selectively transmit the data representative of the association to the first, second, and fifth access points 130, 132, and 138.

Still further in accordance with the example embodiment, the gateway logic 310 is operable to receive from the first access point 130 first proximity data representative of a proximity of the second access point 132 to the first access point 130. The gateway logic 310 is operable to receive from the second access point 132 second proximity data representative of a proximity of the first access point 130 to the second access point 132. The gateway logic 310 is operable to determine the association of the second access point 132 with the first access point 130 in accordance with the first proximity data, the second proximity data, or a combination of the first proximity data and the second proximity data. The association data is selectively stored in the database 124 coupled with the enterprise network controller 110.

Yet further in accordance with the example embodiment, the gateway logic 310 is operable to receive from the second access point 132 data representative of the second service instance set 152 local to the second access point 132 on the second VLAN 162, and to associate the second service instance set 152 with the first access point 130 in accordance with the first proximity data. Data representative of the association is stored in the database 124 coupled with the enterprise network controller 110.

Still yet further in accordance with the example embodiment, the gateway logic 310 is operable to receive from the first access point 130 data representative of the first service instance set 150 local to the first access point 130 on the first VLAN 160, and to associate the first service instance set 150 with the second access point 132 in accordance with the second proximity data. The gateway logic 310 is further operable to receive from the second access point 132 via the second interface 304 a second service query from an associated second client (not shown) of the second access point 132 on the second VLAN 162 and, in response to the second service query, to transmit to the second access point 132 via the second interface 304 data representative of the first service instance set 150 supported by the first access point on the first VLAN 160. The data representative of these associations is stored in the database 124 coupled with the enterprise network controller 110.

Yet still further in accordance with the example embodiment, the gateway logic 310 is operable to receive location data representative of a location of the second access point 132, and to receive service instance name data representative of a name of one or more service instances comprising the second service instance set 152 local to the second access point 132 on the second VLAN 162. Data representative of the location data and the service instance name data is stored in the database 124 coupled with the enterprise network controller 110. The gateway logic 310 is further operable to transmit the location data and the service instance name data to the first access point 130 for visual rendering on an associated display of the client devices associated with the first access point 130 on the first VLAN 162. Network service instances on the first VLAN 160 may be reported to the querying client device on a second VLAN 162 in accordance with a physical location of the client device relative to the network elements. The one or more lists of service instances provided to the querying client device may selectively include intuitive location tag information for identifying the services and the locations of the services. The location and service data may be presented in a concatenated format. In the example embodiment, the service name data and the location data may be concatenated as a location aware service name such as: "service_name_data@location_data" for example.

Figure 4:
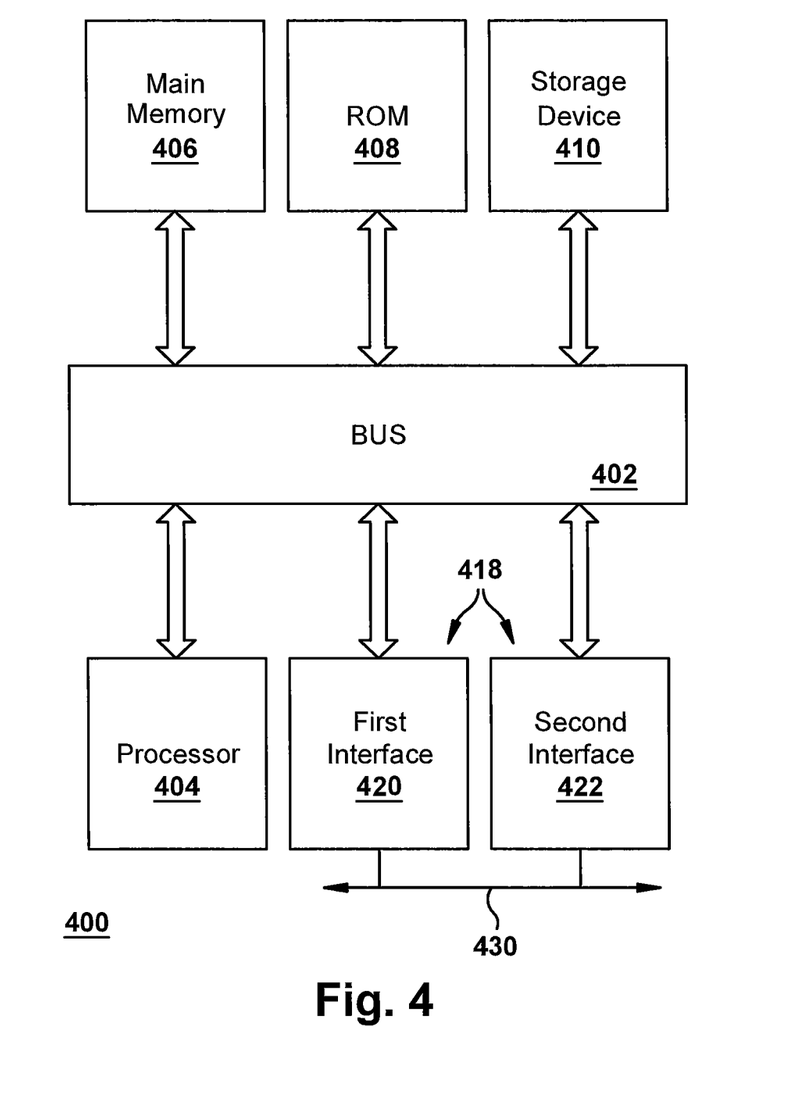
FIG. 4 is a block diagram illustrating an example of a computer system upon which an example embodiment can be implemented.

FIG. 4 is a block diagram illustrating an example of a computer system 400 upon which an example embodiment can be implemented. Computer system 400 may be employed to implement the functionality of the logic in controller 110 (FIG. 1), the control logic 210 of the access point 200 (FIG. 2), and/or the gateway logic 310 in the enterprise network controller apparatus 300 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, and/or flash storage, is provided and coupled to bus 402 for storing information and instructions.

An aspect of the example embodiment is related to the use of computer system 400 for providing detection of service instances available in a network, caching the detected network service instances, and advertising the cached detected network services to client devices in accordance with a physical location of the querying client device in a location aware service instance utility. According to an example embodiment, detecting, caching, and advertising network service instances is provided by computer system 400 in response to the processor 404 executing one or more sequences of one or more instructions contained in a non-transitory main memory 406. Such instructions may be read into main memory 406 from another computer-readable medium, such as storage device 410. The storage device 410 may also be used in connection with the database 124 coupled with the enterprise network controller 110. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 404 for execution. Such a medium may take many forms, including but not limited to non-volatile media, and volatile media. Non-volatile media include for example optical or magnetic disks, such as storage device 410. Volatile media include dynamic memory such as main memory 406. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 comprising first and second communication interfaces 420, 422 operatively coupled with the bus 402. Communication interface 418 provides a two-way data communication coupling computer system 400 to a communication link 430. For example, communication interface 418 may be a local area network (LAN) card to provide a data communication connection to a compatible LAN. As another example, communication interface 418 may be an integrated services digital network (ISDN) card or a modem to provide a data communication connection to a corresponding type of telephone line. Wireless links may also be implemented. In any such implementation, communication interface 418 sends and receives electrical, electromagnetic, or optical signals that carry digital data streams representing various types of information.

In view of the foregoing structural and functional features described above, a methodology in accordance with an example embodiment will be better appreciated with reference to FIGS. 5*a*, 5*b*, 6*a*, 6*b*, 7*a*, 7*b*, 8*a*, 8*b*, 9*a*, and 9*b*. While, for purposes of simplicity of explanation, the methodologies of these FIGURES are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software when executed by a processor, or a combination thereof.

Overall however, in accordance with the example embodiments herein, when a mDNS service query from a wireless client is received by the wireless LAN controller (WLC) such as for example a controller of the one or more access point and/or the enterprise network controller, the WLC knows the access point MAC address where the query requestor is associated. The WLC maintains Radio Resource Management (RRM) proximity group data. The WLC searches the RRM database to find the neighbor access points of the querying client. The WLC then filters the only service providers which are present in the RRM proximity group and sends the mDNS response with those service providers. This ensures that the client sees only those service providers that are physical located nearby.

Figure 5A:
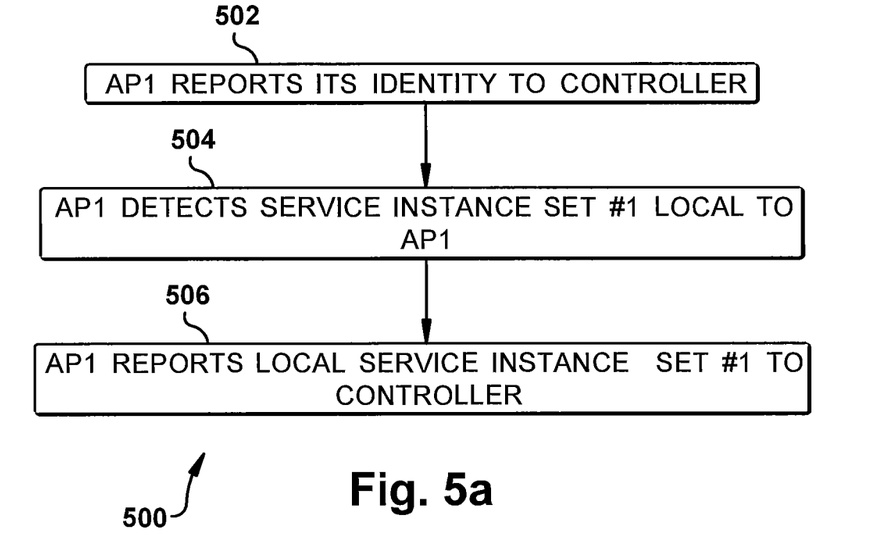
FIGS. 5a and 5b are example methodologies for service instance and access point identity discovery for a first service instance set of a first access point.

FIG. 5*a* is an example of a methodology 500 for reporting access point identification data, service instance set data, and data representative of one or more associations therebetween to the controller 110, 300 in accordance with an example embodiment. Methodology 500 may be implemented by the control logic 210 in the access point 200 (FIGS. 1 and 2).

At 502, the first access point 130 reports its identity to the network controller 300. Data representative of the identity is stored in the database 124 coupled with the enterprise network controller 110.

At 502, the first access point 130 detects a first service instance set 150 local to itself.

At 502, the first access point 130 reports the first local service instance set 150 to the controller.

Figure 5B:
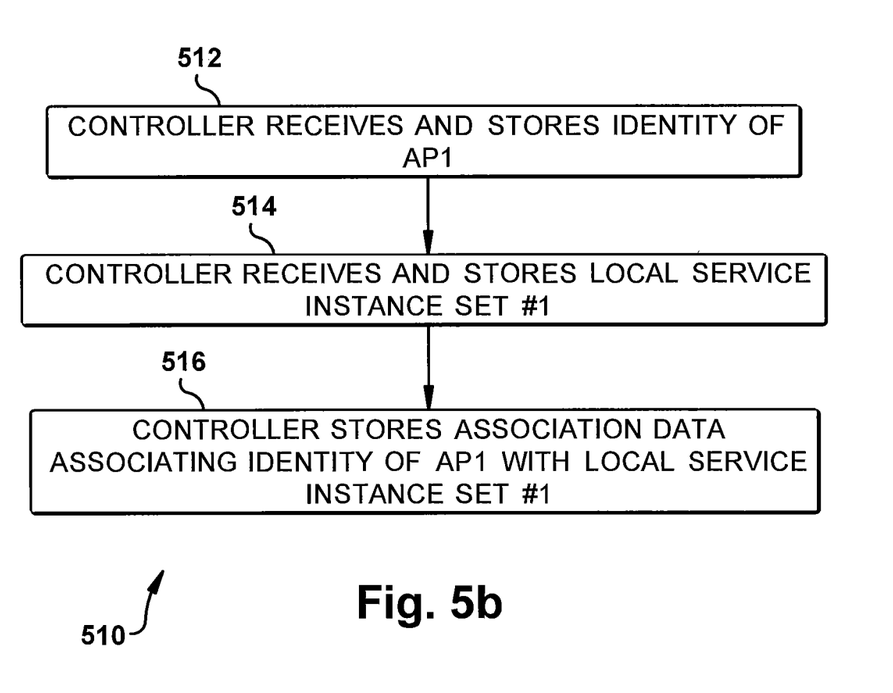

FIG. 5*b* is an example of a methodology 510 for receiving the access point identification data and the service instance set data reports by the controller 110, 300 in accordance with an example embodiment. Methodology 510 may be implemented by the gateway logic 310 in the controller 300 (FIGS. 1 and 2).

At 512, the gateway logic 310 in the controller receives and stores the identity of the first access point 130. The data representative of the identity of the first access point 130 may be stored in a memory local to the first access point, for example.

At 514, the gateway logic 310 in the controller receives and stores the first service instance set 150 local to the first access point 130. The data representative of the identity of the first access point 130 may be stored in a memory local to the first access point, for example.

At 516, the gateway logic 310 in the controller stores association data associating the identity of the first access point 130 with the first local service instance set 150. The association data may be stored in a memory local to the first access point, for example.

Figure 6A:
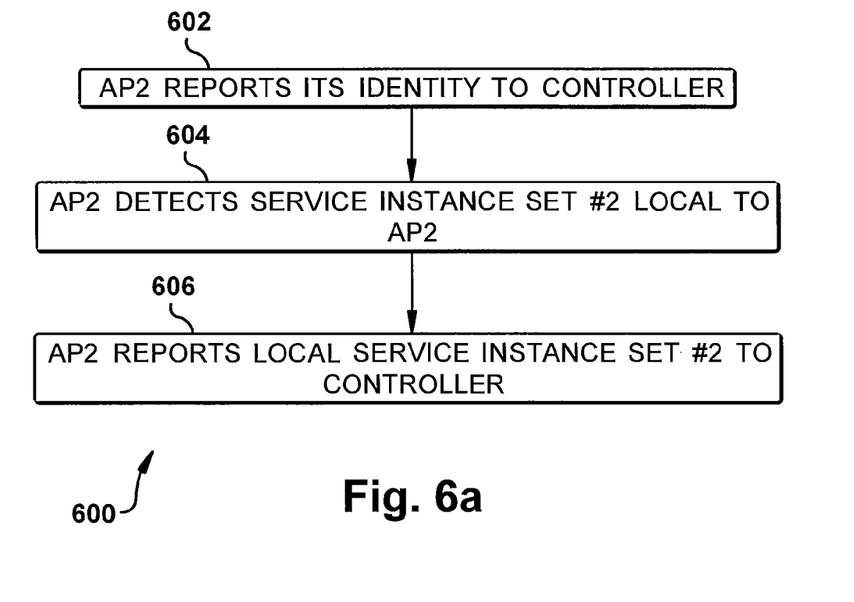
FIGS. 6a and 6b are example methodologies for service instance and access point identity discovery for a second service instance set of a second access point.

Similar to FIG. 5*a*, FIG. 6*a* is an example of a methodology 600 for reporting access point identification data and service instance set data to the controller 110, 300 in accordance with an example embodiment. Methodology 600 may be implemented by the control logic 210 in the access point 200 (FIGS. 1 and 2).

At 602, the second access point 132 reports its identity to the network controller 300.

At 602, the second access point 132 detects a second service instance set 152 local to itself. Data representative of the second service instance set may be stored in a memory local to the second access point, for example.

At 602, the second access point 132 reports the second local service instance set 152 to the controller.

Figure 6B:
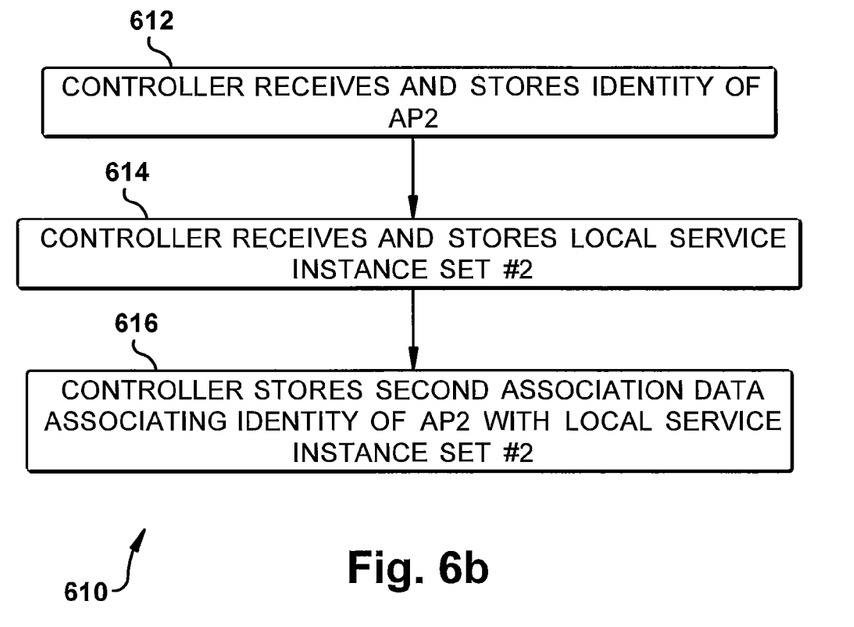

Similar to FIG. 5b, FIG. 6b is an example of a methodology 610 for receiving the access point identification data and the service instance set data reports by the controller 110, 300 in accordance with an example embodiment. Methodology 610 may be implemented by the gateway logic 310 in the controller 300 (FIGS. 1 and 2).

At 612, the gateway logic 310 in the controller receives and stores the identity of the second access point 132. Data representative of the identity of the second access point 132 may be stored in the database 124 coupled with the enterprise network controller 110.

At 614, the gateway logic 310 in the controller receives and stores local the second service instance set 152 local to the second access point 132.

At 616, the gateway logic 310 in the controller stores association data associating the identity of the second access point 132 with the second local service instance set 152.

Figure 7A:
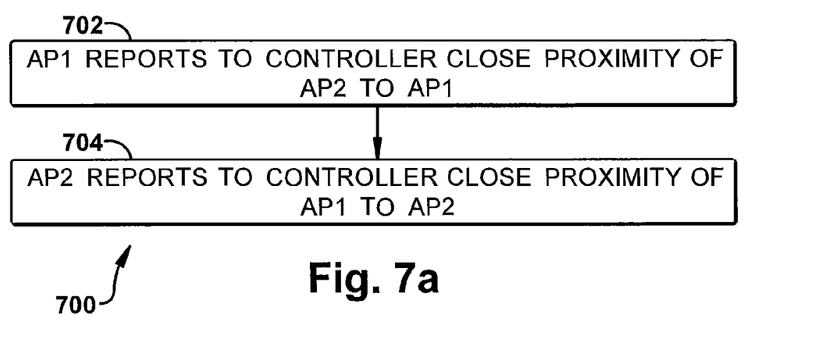
FIGS. 7a and 7b are example methodologies for physical access point proximity discovery and logical service instance set association in accordance with an example embodiment.

FIG. 7a is an example of a methodology 700 for reporting the physical locations of the access points and/or their relative mutual proximities to the controller 110, 300 in accordance with an example embodiment. Methodology 700 may be implemented by the control logic 210 in the access point 200 (FIGS. 1 and 2).

At 702, the first access point 130 reports to the gateway logic 310 of the controller 300 the close proximity of the second access point 132 to the first access point 130. Data representative of the close proximity of the second access point 132 to the first access point 130 is stored in the database 124 coupled with the enterprise network controller 110.

At 704, the second access point 132 reports to the gateway logic 310 of the controller 300 the close proximity of the first access point 130 to the second access point 132. Data representative of the close proximity of the first access point 130 to the second access point 132 is stored in the database 124 coupled with the enterprise network controller 110.

Figure 7B:
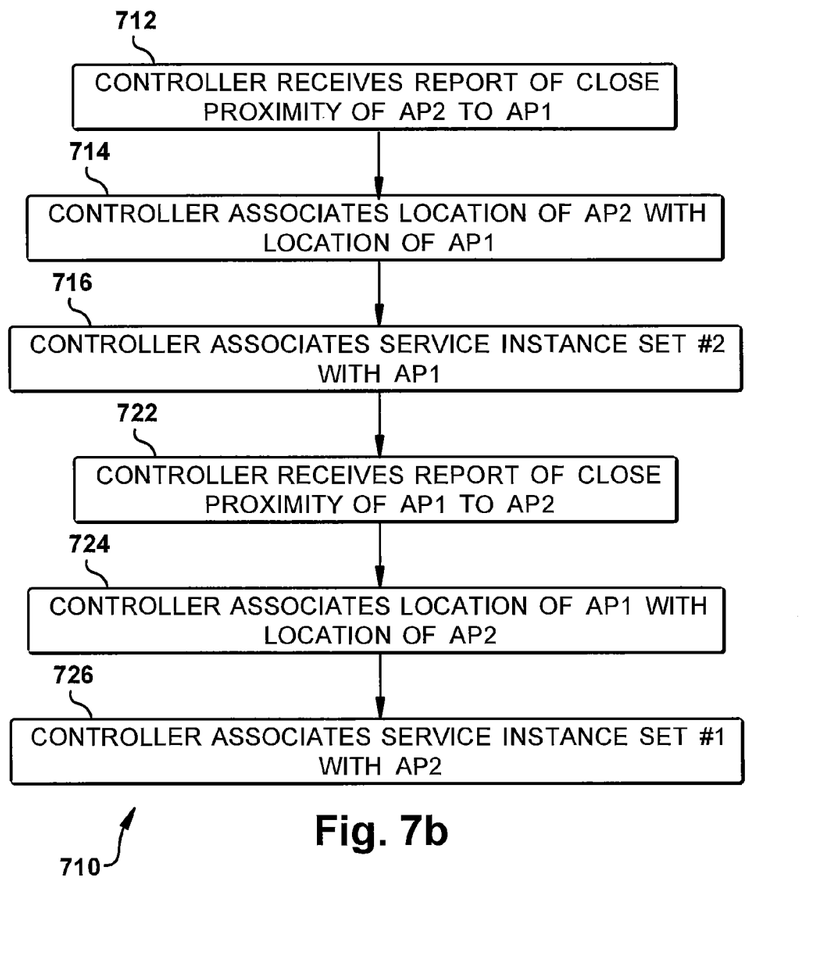

FIG. 7b is an example of a methodology 710 for receiving the data representative of the physical locations of the access points and/or their relative mutual proximities by the controller 110, 300 in accordance with an example embodiment. Methodology 710 may be implemented by the gateway logic 310 in the controller 300 (FIGS. 1 and 2).

At 712, the gateway logic 310 of the controller receives report of close proximity of the second access point 132 to the first access point 130.

At 714, the gateway logic 310 of the controller 300 associates the location of the second access point 132 with location of the first access point 130. Data representative of the association is stored in the database 124 coupled with the enterprise network controller 110.

At 716, the gateway logic 310 of the controller 300 associates the second service instance set 152 with the first access point 130. Data representative of the association is stored in the database 124 coupled with the enterprise network controller 110.

At 722, the gateway logic 310 of the controller 300 receives and stores the report of close proximity of the first access point 130 to the second access point 132.

At 724, the gateway logic 310 of the controller 300 associates the location of the first access point 130 with the location of the second access point 132. Data representative of the association is stored in the database 124 coupled with the enterprise network controller 110.

At 726, the gateway logic 310 of the controller 300 associates the first service instance set 150 with the second access point 132. Data representative of the association is stored in the database 124 coupled with the enterprise network controller 110.

Figure 8A:
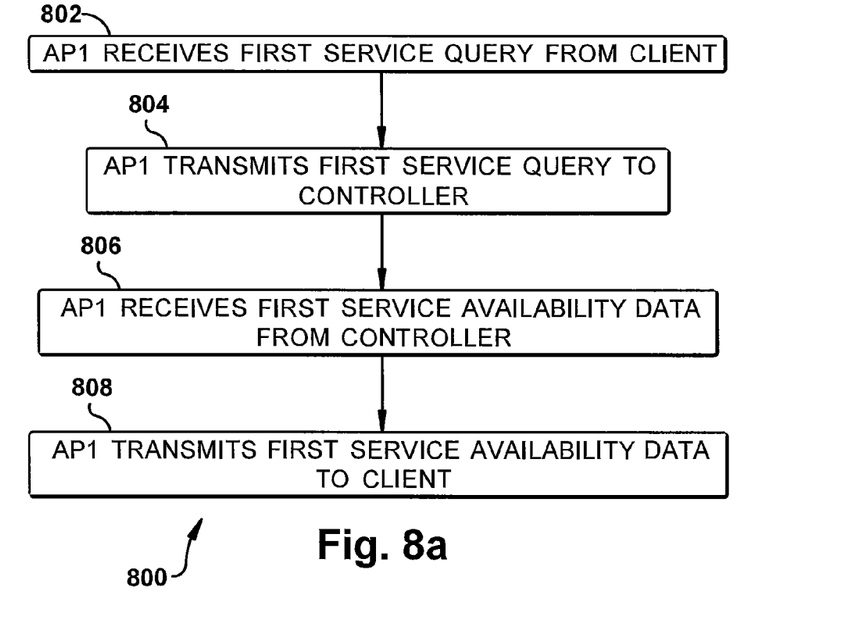
FIGS. 8a and 8b are example methodologies for advertisement of one or more service instance sets associated with a first access point.

FIG. 8a is an example of a methodology 800 of the first access point 130 handling requests for network services from the associated client device 170 in accordance with an example embodiment. Methodology 800 may be implemented by the control logic 210 in the access point 200 (FIGS. 1 and 2).

At 802, the first access point 130 receives a first service query from the associated client device 170.

At 804, the first access point 130 transmits the first service query to the gateway logic 310 of the controller 300.

At 806, the first access point 130 receives first service availability data from the gateway logic 310 of the controller 300. The first service availability data may include data representative of each of the service instance sets 150, 152, and 158 in close proximity to the first access point 130 wherein the second service instance set 152 is wired with the second access point 132, the fifth service instance set 158 is wired with the fifth access point 138, and the first, second, and fifth access point are in close proximity to each other such as being at the same location 140, for example.

At 808, the first access point 130 transmits the first service availability data to the client device 170. The data may include service location data and service name data for example.

Figure 8B:
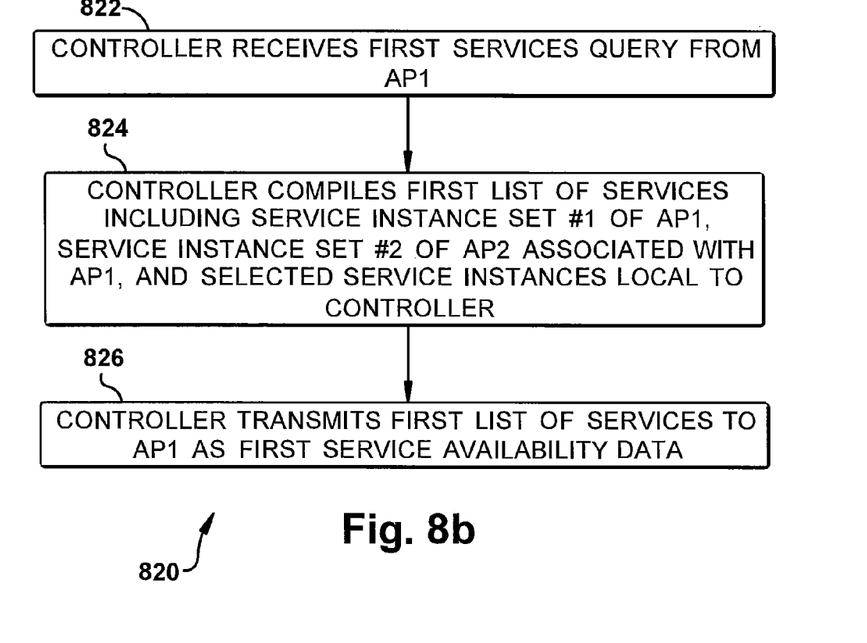

FIG. 8b is an example of a methodology 820 for the gateway logic 310 of the controller 300 receiving a first query for network services from the associated client device via the first access point 130, and providing a location aware list of service instances available to the querying client device, in accordance with an example embodiment. Methodology 820 may be implemented by the gateway logic 310 in the controller 300 (FIGS. 1 and 2).

At 822, the gateway logic 310 of the controller 300 receives the first service query from the first access point 130.

At 824, the gateway logic 310 of the controller 300 compiles a first list of service instances including the first service instance set 150 of the first access point 130, the second service instance set 152 of the second access point 132 associated with the first access point 130, and selected service instances 120, 122 local to the enterprise network controller 110.

At 826, the gateway logic 310 of the controller 300 transmits the first list of services to the first access point 130 as first service instance availability data. In an example embodiment, the first service instance availability data includes data representative of a name of the service instance and data representative of a location of the service instance. By way of example, the service instance name data and the location data may be concatenated as a location aware service name such as: "service_name_data@location_data" for example. In a further particular example embodiment wherein the service instance may be an Apple™ television available at a location in a first conference room, an example of the location aware service name would be "Apple_TV@Conference_Room#1" for example.

Figure 9A:
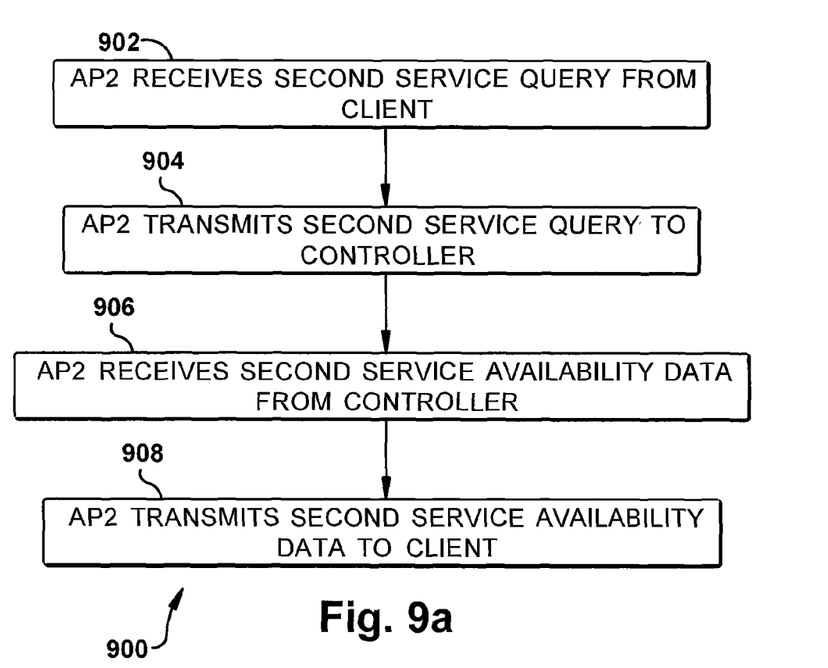
FIGS. 9a and 9b are example methodologies for advertisement of one or more service instance sets associated with a first access point.

Similar to FIG. 8a, FIG. 9a is an example of a methodology 900 of the second access point 132 handling requests for network services from the associated client device in accordance with an example embodiment. Methodology 800 may be implemented by the control logic 210 in the access point 200 (FIGS. 1 and 2).

At 902, the second access point 132 receives a second service query from the associated client device 170.

At 904, the second access point 132 transmits the second service query to the gateway logic 310 of the controller 300.

At 906, the second access point 132 receives second service availability data from the gateway logic 310 of the controller 300.

At 908, the second access point 132 transmits the second service availability data to the associated client device. The second service availability data may include data representative of each of the service instance sets 150, 152, and 158 in close proximity to the second access point 132 wherein the first service instance set 150 is wired with the first access point 130, the fifth service instance set 158 is wired with the fifth access point 138, and the first, second, and fifth access point are in close proximity to each other such as being at the same location 140, for example.

Figure 9B:
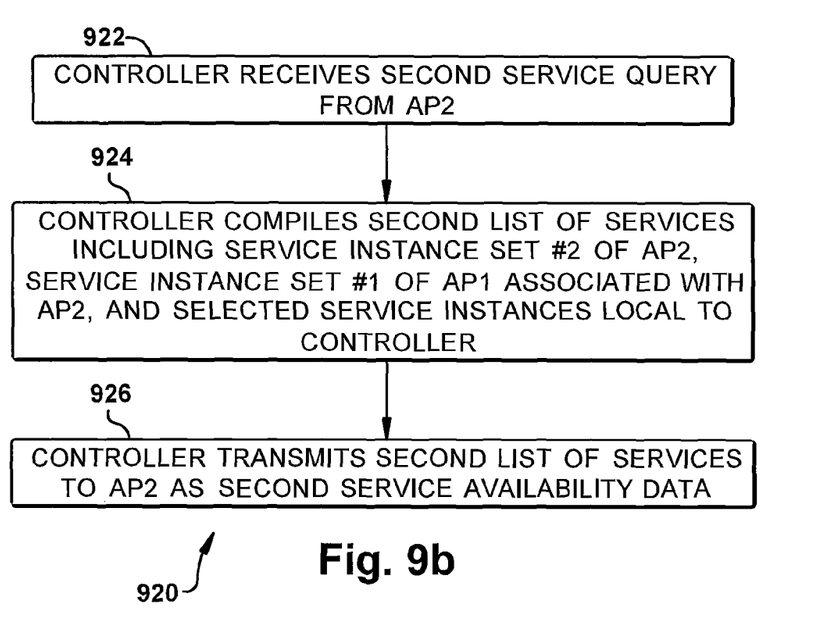

Similar to FIG. 8b, FIG. 9b is an example of a methodology 920 for the gateway logic 310 of the controller 300 receiving a second query for network services from the associated client device via the second access point 132, and providing a location aware list of service instances available to the querying client device, in accordance with an example embodiment. Methodology 820 may be implemented by the gateway logic 310 in the controller 300 (FIGS. 1 and 2).

At 922, the gateway logic 310 of the controller 300 receives the second service query from the second access point 132.

At 924, the gateway logic 310 of the controller 300 compiles a second list of service instances including the second service instance set 152 of the second access point 132, the first service instance set 150 of the first access point 130 associated with the second access point 132, and selected service instances 120, 122 local to the enterprise network controller 110.

At 926, the gateway logic 310 of the controller 300 transmits the second list of services to the second access point 132 as second service instance availability data. In an example embodiment, the second service instance availability data includes data representative of a name of the service instance and data representative of a location of the service instance. By way of example, the service instance name data and the location data may be concatenated as a location aware service name such as: "service_name_data@location_data" for example. In a further example embodiment wherein the service instance may be an Apple™ television available at a location in a first conference room, an example of the location aware service name would be "Apple_TV@Conference_Room_#1" for example.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus comprising:
 a first interface configured to communicate with an associated first access point on an associated first virtual local area network (VLAN), the first access point supporting a first service instance set local to the first access point;
 a second interface configured to communicate with an associated second access point on an associated second VLAN, the second access point supporting a second service instance set local to the second access point; and
 gateway logic coupled with the first and second interfaces and configured to:
  send and receive data via the first and second interfaces;
  receive, from the first access point, via the first interface, a first service query originating from an associated client of the first access point on the first VLAN; and
  receive from the first access point first proximity data representative of a proximity of the second access point to the first access point;
  receive from the second access point second proximity data representative of a proximity of the first access point to the second access point;
  determine an association of the second access point with the first access point in accordance with the first proximity data, the second proximity data, or a combination of the first proximity data and the second proximity data; and
  in response to the first service query, transmit, to the first access point, via the first interface, data representative of the second service instance set supported by the second access point on the second VLAN based on the association.

2. The apparatus according to claim 1, wherein the first interface is further configured to communicate with an associated third access point on the associated first virtual local area network (VLAN), the third access point supporting a third service instance set local to the third access point; and
 wherein the gateway logic is further configured to:
  in accordance with the association,
  selectively transmit, to the first access point via the first interface, the data representative of the second service instance set supported by the second access point on the second VLAN without transmitting to the first access point data representative of the third service instance set supported by the third access point on the first VLAN.

3. The apparatus according to claim 1, wherein the gateway logic is further configured to:
 receive from the second access point data representative of the second service instance set local to the second access point on the second VLAN; and
 associate the second service instance set with the first access point in accordance with the first proximity data.

4. The apparatus according to claim 1, wherein the gateway logic is further configured to:
 receive from the first access point data representative of the first service instance set local to the first access point on the first VLAN;
 associate the first service instance set with the second access point in accordance with the second proximity data;

receive from the second access point via the second interface a second service query originating from an associated second client of the second access point on the second VLAN; and in response to the second service query, transmit, to the second access point via the second interface, data representative of the first service instance set supported by the first access point on the first VLAN.

5. The apparatus according to claim 1, wherein the gateway logic is further configured to:

receive location data representative of a location of the second access point;

receive service instance name data representative of a name of one or more service instances comprising the second service instance set local to the second access point on the second VLAN;

associate the location data with the service instance name data and store data representative of the association in a non-transient memory of the apparatus; and, transmit the data representative of the association of the location data with the service instance name data to the first access point for visual rendering on an associated display of the client associated with the first access point on the first VLAN.

6. A method comprising:

receiving, by gateway logic, from a first access point, on a first VLAN, via a first interface, data representative of a first service instance set supported by the first access point;

receiving, by the gateway logic, from a second access point, on a second VLAN, different than the first VLAN, via a second interface, data representative of a second service instance set supported by the second access point;

receiving, by gateway logic, from the first access point, on the first VLAN, via the first interface, a first service query originating from an associated client of the first access point; and receiving, by the gateway logic, from the first access point, first proximity data representative of a proximity of the second access point to the first access point;

receiving, by the gateway logic, from the second access point, second proximity data representative of a proximity of the first access point to the second access point; and determining, by the gateway logic, an association of the second access point with the first access point in accordance with the first proximity data, the second proximity data, or a combination of the first proximity data and the second proximity data; and responsive to the query, transmitting to the first access point, via the first interface, data representative of the second service instance set supported by the second access point on the second VLAN based on the association.

7. The method according to claim 6, further comprising:

receiving, by the gateway logic, from a third access point, on the first VLAN, via the first interface, data representative of a third service instance set supported by the third access point; and selectively transmitting, by the gateway logic, to the first access point, via the first interface, in accordance with the association, the data representative of the second service instance set supported by the second access point on the second VLAN without transmitting the data representative of the third service instance set supported by the third access point on the first VLAN.

8. The method according to claim 6, further comprising:

receiving, by the gateway logic, from the second access point, data representative of the second service instance set local to the second access point on the second VLAN; and associating, by the gateway logic, the second service instance set with the first access point in accordance with the first proximity data.

9. The method according to claim 6, further comprising:

receiving, by the gateway logic, from the first access point, data representative of the first service instance set local to the first access point on the first VLAN;

associating, by the gateway logic, the first service instance set with the second access point in accordance with the second proximity data;

receiving, by the gateway logic, from the second access point, via the second interface, a second service query originating from an associated second client of the second access point on the second VLAN; and transmitting, by the gateway logic, to the second access point, via the second interface, in response to the second service query, data representative of the first service instance set supported by the first access point on the first VLAN.

10. The method according to claim 6, further comprising:

receiving, by the gateway logic, location data representative of a location of the second access point;

receiving, by the gateway logic, service instance name data representative of a name of one or more service instances comprising the second service instance set local to the second access point on the second VLAN;

associating the location data with the service instance name data; and transmitting, by the gateway logic, to the first access point, data representative of the association of the location data with the service instance name data for selected visual rendering on an associated display of the client associated with the first access point on the first VLAN.

11. Logic encoded in one or more tangible non-transient computer-readable media for execution by a processor and when executed by the processor the logic being configured to:

receive, by gateway logic, from a first access point, on a first VLAN, via a first interface, data representative of a first service instance set supported by the first access point;

receive, by the gateway logic, from a second access point, on a second VLAN, different than the first VLAN, via a second interface, data representative of a second service instance set supported by the second access point;

receive, by the gateway logic, from the first access point, on the first VLAN, via the first interface, a first service query originating from an associated client of the first access point; and receive, from the first access point, first proximity data representative of a proximity of the second access point to the first access point;

receive, from the second access point, second proximity data representative of a proximity of the first access point to the second access point; and determine an association of the second access point with the first access point in accordance with the first proximity data, the second proximity data, or a combination of the first proximity data and the second proximity data; and responsive to the query, transmit, to the first access point, via the first interface, data representative of a second service instance set supported by the second access point on the second VLAN based on the association.

12. The logic according to claim 11, further configured to:
receive, by the gateway logic, from a third access point, on the first VLAN, via the first interface, data representative of a third service instance set supported by the third access point; and
selectively transmit, to the first access point, via the first interface, in accordance with the association, the data representative of the second service instance set supported by the second access point on the second VLAN without transmitting the data representative of the third service instance set supported by the third access point on the first VLAN.

13. The logic according to claim 11, further configured to:
receive from the second access point data representative of the second service instance set local to the second access point on the second VLAN; and
associate the second service instance set with the first access point in accordance with the first proximity data.

14. The logic according to claim 11, further configured to:
receive from the first access point data representative of the first service instance set local to the first access point on the first VLAN;
associate the first service instance set with the second access point in accordance with the second proximity data;
receive from the second access point via the second interface, a second service query originating from an associated second client of the second access point on the second VLAN; and
transmit to the second access point via the second interface, in response to the second service query, data representative of the first service instance set supported by the first access point on the first VLAN.

15. The logic according to claim 11, further configured to:
receive location data representative of a location of the second access point; receive service instance name data representative of a name of one or more service instances comprising the second service instance set local to the second access point on the second VLAN; and
transmit to the first access point the location data and the service name data for selected visual rendering on an associated display of the client associated with the first access point on the first VLAN.

16. An access point comprising:
a first interface coupling the access point with an associated enterprise network controller by an associated first virtual local area network;
a second interface selectively coupling the access point with an associated client device; and
control logic coupled with the first and second interfaces and configured to:
receive service request data representative of a service request from the associated client device;
communicate the service request data to the associated enterprise network controller via the first virtual local area network;
receive service instance data from the associated enterprise network controller via the first virtual local area network, the service instance data being representative of a service instance available to the associated client device and supported by a second access point on a second virtual local area network different than the first virtual local area network; and
communicate the service instance data to the associated client device by the first virtual local area network via the second interface;
transmitting proximity data representative of a proximity of the second access point to the access point to the associated enterprise network controller to determine an association of the second access point with the access point in accordance with the proximity data.

17. The access point according to claim 16, wherein the control logic is further configured to receive service instance data representative of the service instance available to the associated client device on the second access point associated with the second virtual local area network, and communicate the service instance data to the associated client device by the first virtual local area network via the second interface.

18. The access point according to claim 16, wherein the control logic is further configured to:
receive location tag data from the associated enterprise network controller via the first virtual local area network, the location tag data comprising service name data representative of a name of the service instance available to the associated client device on the second access point, and location data representative of a location of the second access point associated with the second virtual local area network; and
communicate the service name data and the location data the associated client device for visual rendering on an associated display of the associated client device.

19. The access point according to claim 16, wherein the control logic is further configured to:
communicate identification data representative of an identification of the access point to the associated enterprise network controller via the first virtual local area network; and
communicate service instance identification data representative of one or more service instances associated with the access point to the associated enterprise network controller.

20. The access point according to claim 16, wherein the control logic is further configured to receive service instance data representative of a service instance local to the enterprise network controller and available to the associated client device, and communicate the service instance data representative of the service instance local to the enterprise network controller to the associated client device by the first virtual local area network via the second interface.

* * * * *